United States Patent [19]
Khan et al.

[11] Patent Number: 6,157,934
[45] Date of Patent: Dec. 5, 2000

[54] METHOD AND APPARATUS FOR USING DISTRIBUTED SPREADSHEETS IN A CLIENT/SERVER ARCHITECTURE FOR WORKFLOW AUTOMATION

[75] Inventors: Rashid N. Khan; Michael Andrade, both of Cary; Paul Williams, Apex, all of N.C.

[73] Assignee: Ultimus, L.L.C., Raleigh, N.C.

[21] Appl. No.: 08/731,435

[22] Filed: Oct. 15, 1996

Related U.S. Application Data

[60] Provisional application No. 60/006,035, Oct. 24, 1995.

[51] Int. Cl.[7] .................................................. G06F 15/00
[52] U.S. Cl. ........................ 707/503; 707/504; 707/505; 345/331; 709/203; 709/231
[58] Field of Search .................................. 707/503, 504, 707/505; 345/200.31, 200.33, 331, 332; 705/3; 709/203, 231

[56] References Cited

U.S. PATENT DOCUMENTS

| | | | |
|---|---|---|---|
| 5,038,318 | 8/1991 | Roseman | 364/901 |
| 5,241,620 | 8/1993 | Ruggiero | 395/22 |
| 5,276,607 | 1/1994 | Harris et al. | 364/401 |
| 5,293,615 | 3/1994 | Amada | 395/600 |
| 5,319,543 | 6/1994 | Wilhelm | 364/901 |
| 5,319,777 | 6/1994 | Perez | 395/600 |
| 5,359,711 | 10/1994 | Hartmann et al. | 707/503 |
| 5,371,675 | 12/1994 | Greif et al. | 707/503 |
| 5,416,842 | 5/1995 | Aziz | 380/30 |
| 5,428,784 | 6/1995 | Cahil, Jr. | 395/650 |
| 5,483,466 | 1/1996 | Kawahara et al. | 364/514 |
| 5,664,207 | 9/1997 | Crumpler et al. | 395/766 |
| 5,729,745 | 3/1998 | Reima et al. | 395/683 |
| 5,812,983 | 9/1998 | Kumagai | 705/3 |
| 5,819,293 | 10/1998 | Comer et al. | 707/203 |
| 5,832,532 | 11/1998 | Kennedy et al. | 707/503 |
| 5,835,683 | 11/1998 | Corella et al. | 707/503 |
| 5,835,758 | 11/1998 | Nochur et al. | 707/102 |
| 5,848,393 | 12/1998 | Gooddridge et al. | 709/100 |
| 5,893,123 | 4/1999 | Tuinenga | 707/504 |
| 5,926,822 | 7/1999 | Garman | 707/503 |
| 5,970,482 | 10/1999 | Pham et al. | 706/16 |
| 6,044,218 | 3/2000 | Faustini | 395/702 |

OTHER PUBLICATIONS

Feiler et al., "Propagator: A Family of Patterns", Technology of Object–Oriented Languages and Sys 1997, Tools 23, Proceedings, pp. 335–336, Jul. 1997.
Borland, Quattro Pro User's Guide, pp. 342, 343, 348, 349, 470, 471, 510, 511, 1993.
Forbes Magazine, Apr. 22, 1996, pp. 204–205; "The Digitizing Dentist".

*Primary Examiner*—Stephen S. Hong
*Assistant Examiner*—Cong-Lac Huynh
*Attorney, Agent, or Firm*—Rhodes & Mason, PLLC

[57] ABSTRACT

An apparatus for workflow automation includes a server computer and a plurality of client computers. Each client computer has an electronic coupling to the server computer for transmission of information between the server computer and each of the client computers and data entry elements and form interfaces for a user to fill out using the data entry elements. The server and client computers are configured to have a main spreadsheet on the server computer and client spreadsheets on the client computers with data entered in the form interfaces also appearing in the client spreadsheets, links from cells in the main spreadsheet to cells in the client spreadsheets, and directional instructions for sequentially routing data from client and server spreadsheets according to a workflow plan. The server computer is also configured to permit creation or revision of the directional instructions and to permit a user to graphically establish linking of cells to determine a flow of information without having to write lines of programming code.

31 Claims, 5 Drawing Sheets

6,157,934

METHOD AND APPARATUS FOR USING DISTRIBUTED SPREADSHEETS IN A CLIENT/SERVER ARCHITECTURE FOR WORKFLOW AUTOMATION

This application claims the benefit of the filing date of provisional application No. 60/006,035 filed on Oct. 24, 1995.

BACKGROUND OF THE INVENTION

This invention relates generally to computers and. more particularly to a distributed client/server spreadsheet software for workflow automation.

Workflow involves many individuals working in series or in parallel to achieve a common goal. There are numerous examples of workflow processes in an office or a business environment. These include expense reports, order processing, performance reviews, time sheets, capital appropriation requests, engineering change orders, and many more. Workflow typically begins when an individual makes a request or submits some information. This request is forwarded to one or more individuals for review and/or input. It may then go to some other individuals for further review and/or input. This process continues till it concludes based upon rules which the organization has defined. An important aspect of workflow is that different individuals participate in workflow at different times and at different locations.

Workflow automation involves the automation of a workflow process using computer technology. It is a distributed application because, by definition, more than one individual is involved. These individuals do their work using their own computers in the different geographic locations, and at different times.

Because of the involvement of more than one individual, a key problem of workflow automation is to provide a means of collecting and distributing information from different individuals at different times in some logical sequence. Traditionally this has been accomplished by creating electronic forms for each individual in a workflow process, and writing the software which collects, massages and distributes this information to individuals involved in subsequent steps of the workflow process. In modern workflow automation system the information is gathered from a user by inputting to a computer (the client) and is sent to a central computer (the server). This server massages this information and combines it with the information gathered from other users, and sends appropriate parts of the information to clients at subsequent steps in the workflow process. Creating these programs for collecting, massaging and distributing data from a number of different clients based upon pre-defined rules is a difficult, time-consuming and costly undertaking, which generally involves programming, scripting or developing macros. Thus, there remains a need for an easy to use and easy to create workflow system.

SUMMARY OF THE INVENTION

The present invention fulfills this need in the art by providing an apparatus for workflow automation that includes a server computer and a plurality of client computers each having an electronic coupling to the server computer for transmission of information between the server computer and each of the client computers. The server and client computers are configured to have a main spreadsheet on the server computer and client spreadsheets on the client computers, links from cells in the main spreadsheet to cells in the client spreadsheets, and directional instructions for sequentially routing data among client and main (server) spreadsheets.

Preferably, the client computers have data entry elements and form interfaces for a user to fill out using the data entry elements, with data entered in the form interface also appearing in the client spreadsheet for use according to the directional instructions. The electronic coupling may take various forms, such as electronic mail, the Internet, or data files.

In a preferred embodiment the server computer is configured to permit creation or revision of the directional instructions. Desirably, the server computer is configured to permit a user to graphically establish linking of cells to determine a flow of information without having to write lines of programming code. Preferably, the server computer is configured to graphically specify actions and operations which are performed when data is transferred. Typically, the main or server spreadsheet consolidates workflow data in the server computer for the purpose of workflow automation. The directional instructions may cause the server computer to perform only the calculations and other operations for the workflow which are best performed at a central location. The directional instructions may also cause the multiple, client spreadsheets at client computers to display and massage only the parts of the workflow data which are relevant to the user who participates in the workflow process at that client computer.

The invention also provides a software product for workflow automation including an electronic storage medium holding electronic information which, when loaded on a server computer and a plurality of client computers electronically coupled to the server computer causes them to behave as described above.

The invention also provides a method of workflow automation includes the steps of providing a server computer and a plurality of client computers each having an electronic coupling to the server computer for transmission of information between the server computer and each of the client computers, entering data into a first client spreadsheet on a first client computer, transmitting the entered data from the first client spreadsheet to a main spreadsheet on the server computer according to directions stored on the first client computer, and transmitting the data from the main spreadsheet or a derivative of such data to a second spreadsheet on a second client computer for further processing.

The data entry step may include entering data into a form interface and directing data entered in the form interface to the first client spreadsheet. The transmission may be over electronic mail or the Internet, data files or other suitable media.

The method may include the preliminary step of graphically creating a workflow plan establishing the spreadsheets and directional instructions for determining data flows between the computers. It may also include the preliminary step of graphically establishing links of cells to determine a flow of information without writing lines of programming code and/or graphically specifying actions and operations which are performed when data is transferred.

Typically, the main spreadsheet consolidates workflow data.

After the first transmitting step, the method may include performing calculations and operations in the server computer which are best performed at a central location. After the entering step, the method may include displaying and massaging data in the first client computer, which are relevant to the user who participates in the workflow process at the first client computer. After the second transmitting step, the method may include displaying and massaging data in the second client computer, which are relevant to the user who participates in the workflow process at the second client computer.

A method is described for using spreadsheets on multiple computers which are linked together for the purpose of routing information and performing calculations to facilitate workflow automation in a client/server architecture. The method involves using "client" spreadsheets which are local to each participant's computer, and a main or "server" spreadsheet which runs on the central server computer. Certain cells in the "client" or local spreadsheet are linked to cells in the "server" or main spreadsheet where the information is centralized. The mechanism for linking is typically electronic mail, but could also be any other means of sending electronic data from one computer to another. These other methods of linking include data files using standard network protocols, the Internet http protocol, etc. For each linked cell the designer of the workflow process can also specify the direction of the data flow and the action which will be taken when the data reaches the destination cell.

This architecture has three essential properties which make it ideally suited for workflow automation. They are (i) the spreadsheets are independent of each other except for the information exchanged via linking, (ii) the spreadsheets may be in different geographic locations, and (iii) the spreadsheets are updated independent of each other, i.e. in non-real-time.

For each linked cell the designer of the workflow process can also specify the direction of the data flow and the action which will be taken when the data reaches the destination cell. The distributed client/server spreadsheet architecture is shown in FIG. 1.

The server spreadsheet feeds information to the client spreadsheets. When the client user decides to perform the workflow task, he or she operates on the data in the client spreadsheet by using electronic forms. The data entered or viewed by the client user is massaged by the logic entered in the local spreadsheet. "Massaging" as used herein includes any data manipulation characteristic of spreadsheets. When the user completes the task, the contents of the cells in the local spreadsheet linked to the server spreadsheet, are sent to the server spreadsheet using electronic mail, or some other means of electronic data communication.

The server, or main spreadsheet collects data from all client users. This data is massaged and operated upon by the logic in the main spreadsheet. The contents of the linked cells in the main spreadsheet are then sent to the local spreadsheet of the next step in the workflow. This process is repeated for all the steps in the workflow from its initiation to its conclusion.

Since there could be large number of users involved in a workflow process, and since each user will be working on one spreadsheet, it is important to be able to define and manage the links between each client spreadsheet and the main spreadsheet. The invention uses a graphical way of linking the spreadsheets. This graphical technique displays a "map" of the workflow process which shows all the steps in the process. This permits an automation designer to graphically link cells in the main spreadsheet to cells in one or more local spreadsheets for the different steps. The map also graphically displays the links after they have been made. This graphical linking is very easy and intuitive because of the visual aspect of making and displaying the links.

A secondary, but important, aspect of the invention is the use of an electronic form with the local or client spreadsheets. Users participate in the workflow by entering data in the spreadsheets. However, spreadsheets are not user friendly since they display a lot of information. The large majority of this information is not important to the user, and in most cases it is prudent to hide this data from the users to prevent errors. To accomplish this, the invention uses electronic forms as the means of allowing users to interface with the spreadsheets. The invention includes a forms designer. Fields and other objects in the forms designer are linked to cells in the local spreadsheet. When the user activates the form, the fields in the form display the contents of the cell(s) they are linked to. When the user edits or enters data in to the form fields, the data is entered in to the spreadsheet. The spreadsheet is instantaneously re-calculated, and the new values are automatically updated on the form. The user therefore does not see and is unable to change any of the cells other than those which are linked to the form. When the user "sends" the form, the linked cells from the local spreadsheet are transferred to the main spreadsheet.

This method and architecture enables the creation of a workflow automation system which allows process designers to visualize and centralize all information in the main "server" spreadsheet, link or "distribute" parts of the main spreadsheet to multiple "client" spreadsheets as is appropriate for the workflow application. Workflow calculations are performed in a true client/server model; some parts of the calculations are performed in the local spreadsheets (the client), whereas others are performed in the main spreadsheet (the server).

The use of spreadsheets to perform the calculations also precludes the need of having to write programs. The use of electronic forms as a "window" for the client user to view the local spreadsheet, provides a visually appealing user interface and hides the complexity of the spreadsheet from the user.

BRIEF DESCRIPTION OF THE DRAWINGS

The invention will be better understood after a reading of the Detailed Description of the Preferred Embodiments and a review of the drawings in which.

DETAILED DESCRIPTION OF A PREFERRED EMBODIMENT OF THE INVENTION

Figure 4:
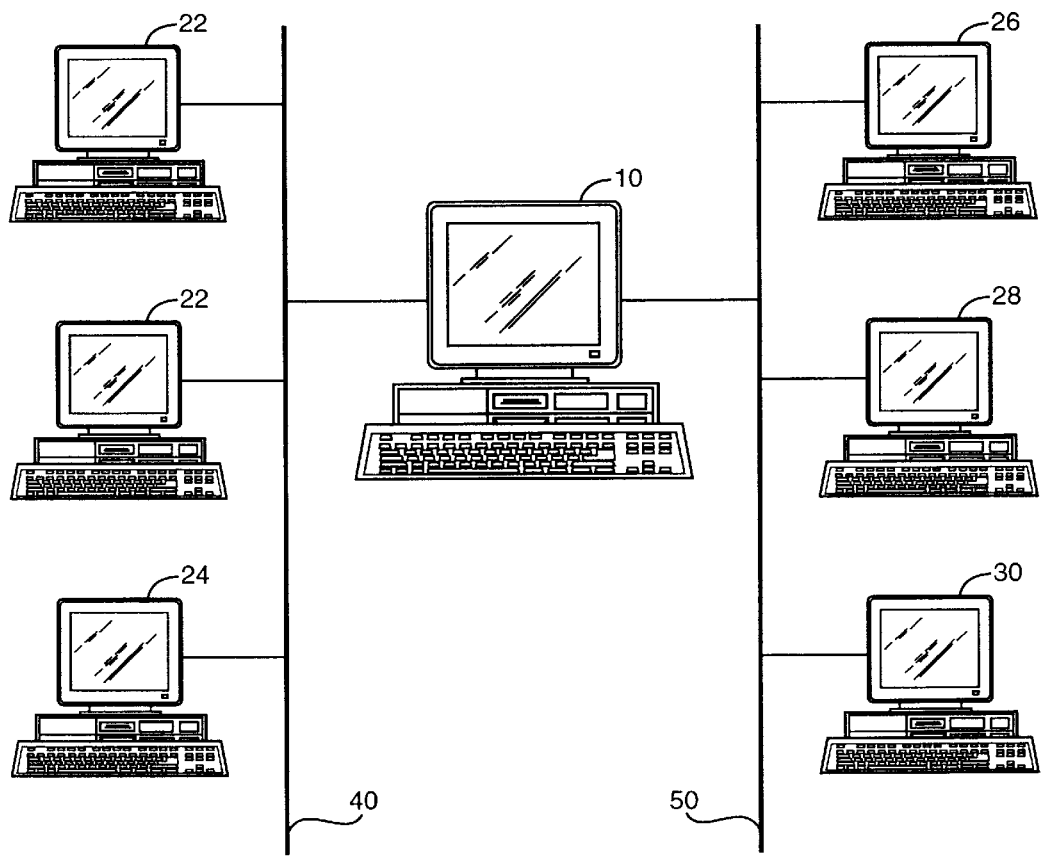
FIG. 4 is a schematic depiction of several computers electronically coupled and equipped with suitable software in accordance with a preferred embodiment of the invention.

As seen in FIG. 4, the invention uses several computers linked together in a configuration allowing electronic communication between them. FIG. 4 shows a server computer 10 and client computers 20, 22, 24, 26, 28 and 30, described in more detail hereinafter. The computers 20, 22, and 24 are shown linked to server 10 by a connection like the Internet 40. The computers 26, 28, and 30 are shown linked to server 10 by a connection like a local area network 50 permitting e-mail communications. The client computers are preferably IBM-compatible personal computers with a 386 microprocessor or better, 4 MB RAM and at least 5 MB of free hard disk space. The server computer is preferable IBM-compatible personal computers with a 486 microprocessor or better, 8 MB RAM and at least 20 MB of free hard disk space. The computer system preferably is configured with an operating system like Microsoft Windows 3.1, Windows for Workgroups 3.11 or Windows NT. The preferred e-mail capability is Microsoft Mail, Lotus cc:Mail (VIM) or Novell MHS.

Figure 5:
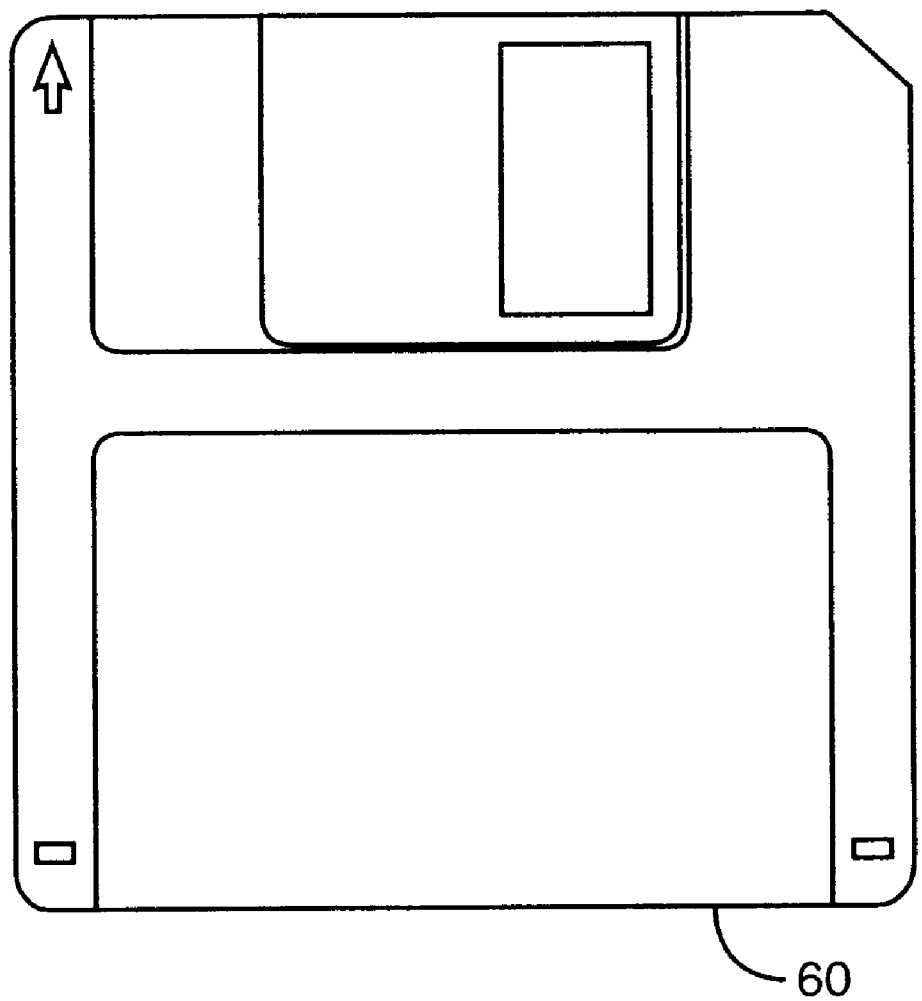
FIG. 5 is a view of a computer diskette on which software capable of implementing the invention when loaded on a computer network may be recorded.

In the preferred embodiment, the client/server spreadsheets for workflow automation include a central "server" spreadsheet and multiple "client" spreadsheets. A database table, or a graphical grid with rows and columns of cells may also be used instead of a spreadsheet, if necessary. The server spreadsheet is located on server computer 10 and the client spreadsheets are located at their respective client computers 20, 22, 24, 26, 28 and 30. The computers may be configured to run as the invention by installing software recorded on a storage medium such as the diskette 60 shown in FIG. 5.

Through a linking of one or more cells in the "server" spreadsheet with cells in the client spreadsheet via an electronic means of data communication, such as electronic mail, a distributed spreadsheet is created. The means of graphically linking these cells to decide the flow of information without having to do any programming is a key asset of this architecture. Also the means of specifying the actions and operations which are performed when the data is transferred assist in creating a highly effective workflow automation system.

The system uses a central server spreadsheet to consolidate workflow data in a central computer for the purpose of workflow automation, and to perform only the calculations and other operations which are best performed at a central location.

Multiple, client spreadsheets at client computers display and massage only the parts of the workflow data which is relevant to the client user who participates in the workflow process at a particular step, so the system creates a distributed system for data entry and manipulation. This allows the workflow designer to instruct the remote performance of calculations and other operations which are best performed at the client computer location.

Secondary to the above attributes, the use of electronic forms at each client computer and which displays only the relevant parts of the spreadsheet to the client user in visually appealing graphical format, allows the user to enter data in the form which is fed back in to the client spreadsheet and massaged by the logic embedded in the spreadsheet.

Figure 1:
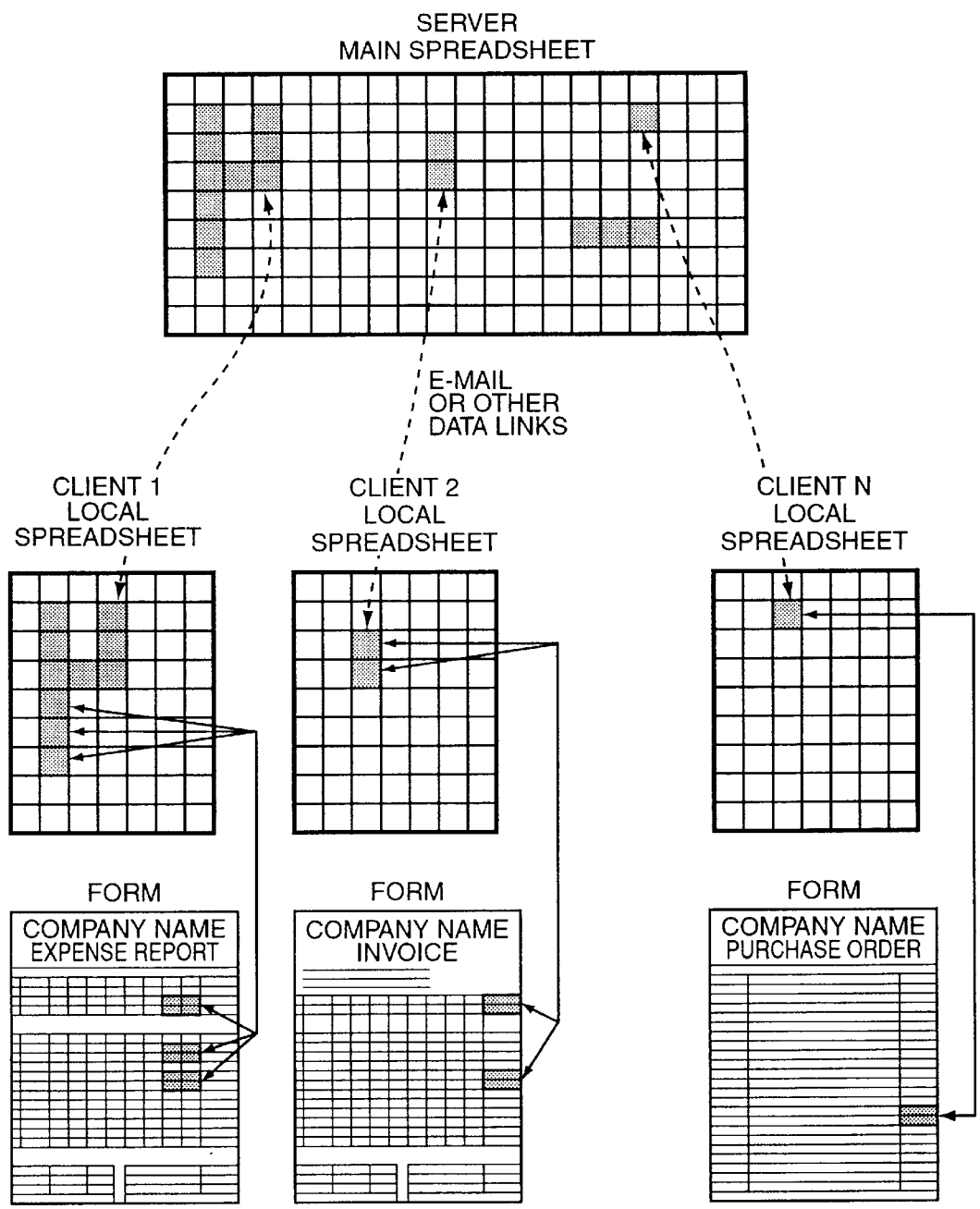
FIG. 1 is a schematic depiction of client/server distributed spreadsheet architecture according to an embodiment of the invention.
Figure 2:
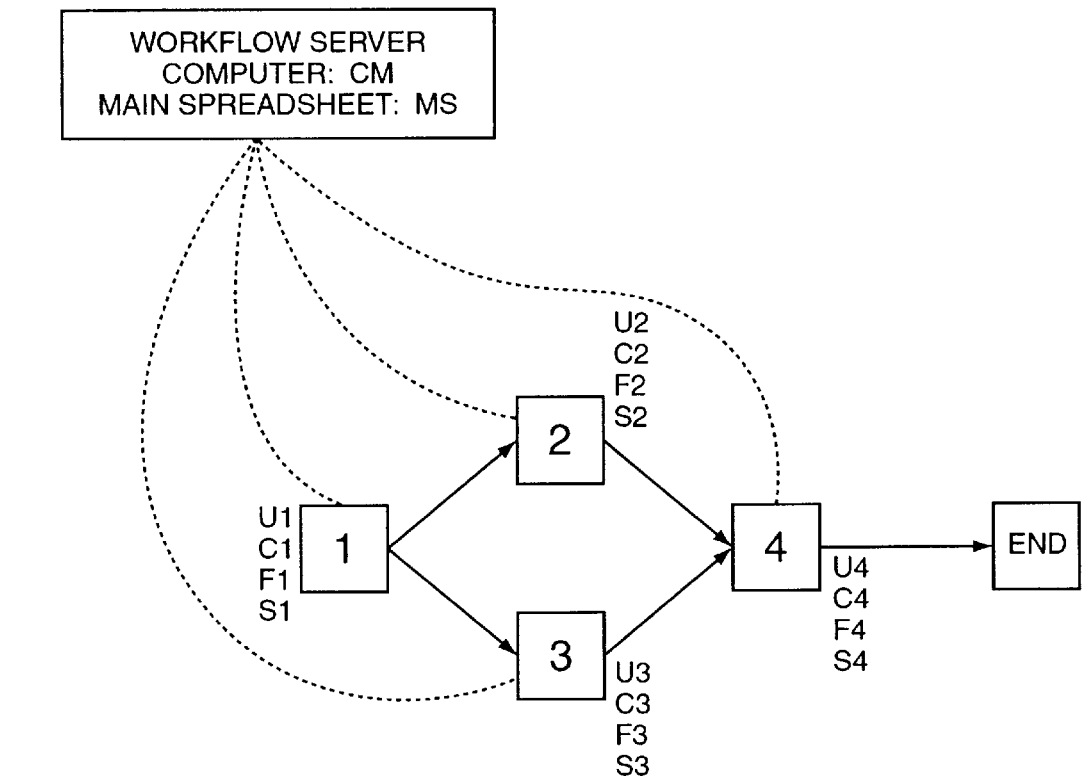
FIG. 2 is a simple workflow map showing clients, servers, forms and spreadsheets according to an embodiment of the invention.

The distributed client/server spreadsheet architecture is shown in FIG. 1. To describe the invention in detail, we will first describe how it is used to distribute and collect workflow information. We will then describe how the spreadsheets are linked graphically as a part of designing the process. For both these descriptions please refer to the simple workflow map in FIG. 2, which we will use as an example. This shows a simple four step process map and the various components at each step. In this example we will use e-mail as the method of communication, but in practice it could be any other means of electronic communication for data and the software to manage this communication. Each of the steps is performed by a user Un, at computer Cn, using local spreadsheet Sn and form Fn. In addition the server runs at computer CM and uses main spreadsheet SM.

When the application is first installed, the workflow server CM distributes all the local spreadsheets and forms for all the steps to the computers Cx, which the users Ux will be using to perform their tasks. The forms and the spreadsheet are saved in the computers Cx for future use.

The user U1 starts the workflow process at computer C1 by invoking the form F1 for the first step. Typical forms used as such form interfaces can be seen in FIG. 1. The form is displayed and any default values in the spreadsheet S1 are also displayed on the form. User U1 enters all the necessary information in F1. As the user U1 enters data in the form F1, the data is fed in to the spreadsheet S1. The spreadsheet S1 is recalculated instantaneously, and any changes are reflected back on the form F1. When the user U1 completes the form F1 and "sends" it, the client software at C1 takes the linked cells from S1 and send its via e-mail (for example) to the server computer CM. The software includes a command to transmit the linked cells to the server computer CM, without need for the user U1 to take any particular steps to transmit the e-mail.

Upon receipt of the message from C1, the server software takes the data from the e-mail message and updates the cells in the main spreadsheet SM with the data from the linked cells in S1. It then recalculates the main spreadsheet SM.

The server software then determines the next steps(s) to be executed. These will be Step 2 and Step 3, as dictated by the process map. The server software takes the contents of the main spreadsheet SM cells linked to the local spreadsheet S2 and S3, respectively, and send an e-mail messages containing the data for the linked cells to C2 and C3.

C2 and C3 receive the message, insert the data into their respective local spreadsheets S2 and S3 and, and recalculate the spreadsheets. They are now ready for their users U2 and U3, respectively, to perform their tasks.

When user U2 performs the task for Step 2 using the form F2, the sequence of actions and updates are like those described for Step 1 above. However, when the server CM receives data indicating that the sequence at C2 is complete, it does not proceed to Step 4 because it has to wait for Step 3 to also be completed.

When user U3 is ready to do task for Step 3 using the form F3, the sequence of actions and updates are like those described for Step 1 above. If Step 3 is completed before Step 2, the server does not proceed to Step 4 because it has to wait for Step 2 to also be completed.

When both Step 2 and Step 3 have been completed, the server software determines that it is time to do Step 4. The server software then invokes Step 4, and the sequence of operations as described above for Step 2 and Step 3 will occur for Step 4. When Step 4 has been completed, the server software determines that the workflow has come to an end as dictated by the process map. Of course, the four Steps described above are exemplary only. One of the advantages of the invention is the way it permits a myriad of different workflows to be designed and carried out, using a few simple rules.

Important things to note in the above description are:
  Each step can be done at any time after it is invoked. There is no need for all the steps to be done simultaneously, or within a certain timeframe.

Each step can be done at a different geographic location.

Only the linked data is transferred from each local spreadsheet to the main spreadsheet.

All the local spreadsheets are independent of each other.

Users work with forms, not the spreadsheets. Forms are linked to the spreadsheet but hide the complexity of the spreadsheets.

The server software controls the logical sequence of flow.

One cell range in the main spreadsheet may be linked to a cell range in many different local spreadsheets. This one to many relationship is possible only because the spreadsheets are independent of each other and work in a sequence.

The spreadsheets are not updated on a real time basis. That is, data entered in a client spreadsheet does not necessarily immediately cause a change in the main spreadsheet or any other client spreadsheet. The changes, if they occur, occur after completion of a step at the spreadsheet in which the data is entered. This is ideal for workflow automation where the steps occur in a sequence, and the same main spreadsheet cell may be used to send/receive information from different clients at different times.

Figure 3:
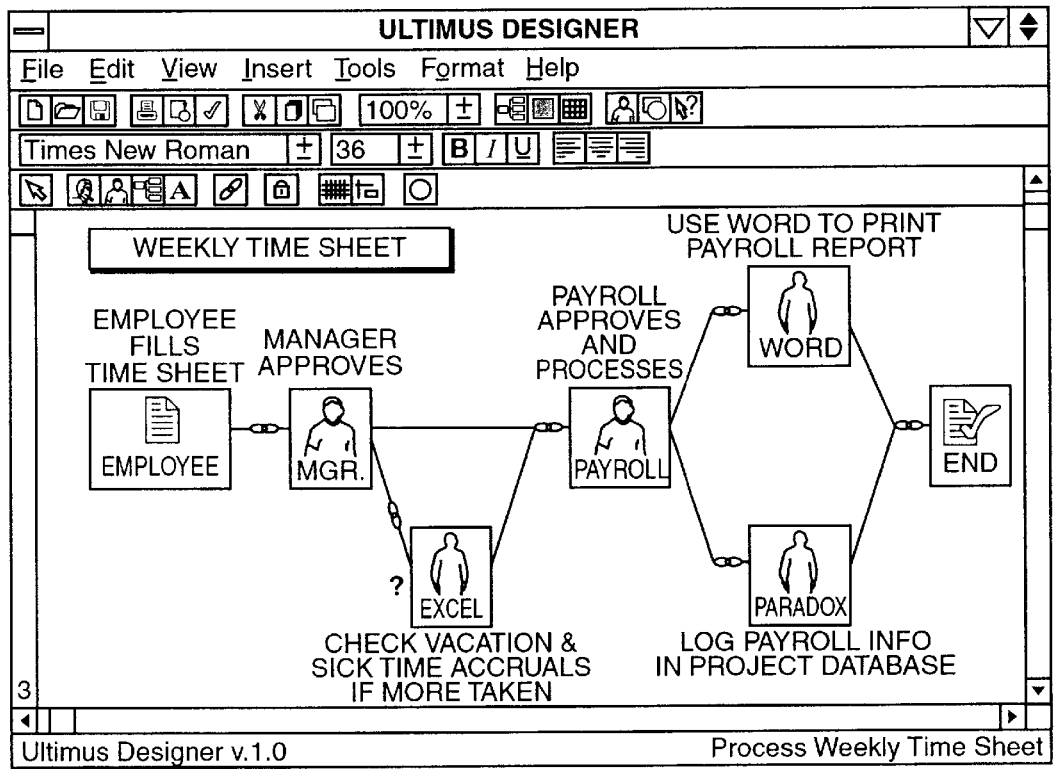
FIG. 3 is a depiction of a computer screen showing the workflow designer of an embodiment of the invention being used to design a workflow process.

In the example shown above there are only 4 steps. In real life their may actually be many more steps. Since the linking of the local spreadsheet to the main spreadsheet is an important feature of the invention, it is very important to be able to easily link the cells and display the links. A preferred embodiment of the invention provides a graphical user interface to establish these links, as seen in FIG. 3 as a Windows-style video screen. The designer may click a mouse pointer on the icons and use "drag-and-drop" methodology common to Windows applications, to instruct the software to recognize the instructions thus set forth to build a command file to direct the links as desired. The invention accomplishes this using a graphical and intuitive approach described below:

1. Software displays the process map indicating each step in the workflow.

2. Software also displays a button for the main or server spreadsheet, and a list of the linked cells in the main spreadsheet, also called the Linked List. This display is similar to FIG. 2

3. To make a link, a workflow designer first clicks the main spreadsheet button. This will cause the program to display the main spreadsheet.

4. Workflow designer then selects a cell range, CRM, in the main spreadsheet. The name of the selected cell range appears in the Linked List.

5. To link the cell range CRM in the main spreadsheet to a range in a local spreadsheet, the workflow designer simply clicks on any step in the process map. The local spreadsheet for the step will be displayed. Workflow designer selects a cell range in the local spreadsheet, and clicks a link button. The link will be established. Workflow designer may also at this point establish if the link is bi-directional or uni-directional.

6. As soon as the link is made, the step changes color and is highlighted, indicating that it has a cell range linked to CRM in the main spreadsheet.

7. The workflow designer can now repeat steps 5 and 6 and link the main spreadsheet cell range CRM to any number of steps. All the linked steps will be highlighted by a unique color.

8. To display links, workflow designer can simply select a cell range from the Linked List. This will cause all the steps to which it is linked to be highlighted. Furthermore, the name of the cell range in each step to which it is linked will also be displayed, so the workflow designer can quickly determine all the steps and the cell range in the steps to which any main spreadsheet cell range is linked.

9. The workflow designer can also select a cell range in any step. This will cause the program to display all the other steps and the main spreadsheet variable to which it is linked.

This method for linking is easy because it is graphical and intuitive. In doing so, a program or command structure is created in each client computer instructing the client computer to carry out the steps of invoking the spreadsheet and its associated form and directional information for massaging incoming data and sending outgoing data. A similar program is established in the server, indicating the steps the server is to follow in carrying out the workflow process.

The cell-to-cell linking of the main and client spreadsheets allows the data to be transferred from one to the other with a pre-specified destination—the cell identification in the linked spreadsheet. The workflow designer can specify four possible linking attributes:

1. Main-to-Local: data is transferred from the Main to a Local or client spreadsheet only. This is useful in situations where the local spreadsheet is used to inform the user at the client computer of the value of a particular variable.

2. Local-to-Main: data is transferred from the Local or client spreadsheet to the Main spreadsheet only. This is useful when the data originates at a User's step, and there is no need or reason to receive it from another step.

3. Bi-directional: data is transferred in both directions. This is useful if the data originates at some other place and the user needs to have the option of changing it.

4. Local-to-Main Indexed: data is transferred for the local to the main spreadsheet only. However, each time the data is transferred, the cell address in the main spreadsheet is incremented, or indexed, by one. Thus, the next time data is transferred, it goes to the next cell in the column in the main spreadsheet. This is used if the step is assigned to a "group." In this case the form for the step will be filled out by more than one individual at more than one client computer and it is desirable to capture the data from all of the individuals, without later data entries overwriting the earlier ones. The indexed cell addresses in the Main spreadsheet receive and retain these differing values.

Those of ordinary skill in the art using this process description will be able to write programming code to carry out the invention. In addition, software carrying out the invention is commercially available, sold under the name Ultimus by Ultimus LLC, assignee of this application, 4915 Waters Edge Drive, Suite 135, Raleigh, N. Ca. 27606, telephone (919) 233-7331, Fax (919) 233-7339, e-mail: Ultimus@ix.netcom.com, WWW:http:\www.ultimus1.com. The disclosures of the publications and products of that company are hereby incorporated by reference.

What is claimed is:

1. An apparatus for workflow automation comprising
a server computer,
a plurality of client computers each having an electronic coupling to said server computer for transmission of information between said server computer and each of said client computers,
said server and client computers being configured to have a main spreadsheet on said server computer and client spreadsheets on said client computers, links from at least one of the cells in said main spreadsheet to predetermined cells in said client spreadsheets, and directional instructions for specifying the direction of sequentially routing data from the cells in the client and server spreadsheets.

2. An apparatus as claimed in claim 1 wherein said client computers have data entry elements and form interfaces for a user to fill out using said data entry elements, with data entered in said form interface also appearing in said client spreadsheet for use according to the directional instructions.

3. An apparatus as claimed in claim 1 wherein said server computer is configured to permit creation or revision of said directional instructions.

4. An apparatus as claimed in claim 1 wherein said electronic coupling is electronic mail, the Internet, or data files.

5. An apparatus as claimed in claim 1 wherein said server computer is configured to permit a workflow designer to graphically establish linking of cells to determine a flow of information without having to write lines of programming code.

6. An apparatus as claimed in claim 1 wherein said server computer is configured to graphically specify actions and operations which are performed when data is transferred.

7. An apparatus as claimed in claim 1 wherein said server spreadsheet consolidates workflow data in said server computer for the purpose of workflow automation.

8. An apparatus as claimed in claim 7 wherein said directional instructions cause said server computer to perform only the calculations and other operations for the workflow which are best performed at a central location.

9. An apparatus as claimed in claim 1 wherein said directional instructions cause said multiple, client spreadsheets at client computers to display and manipulate only the parts of the workflow data which are relevant to the client user who participates in the workflow process at that client computer.

10. An apparatus as claimed in claim 1 wherein the server and client computers are configured such that the directional instructions instruct the routing of data both from one or more of the client spreadsheets to the main spreadsheet and from the main spreadsheet to one or more client spreadsheets.

11. An apparatus as claimed in claim 10 wherein the directional instructions provide for the forwarding of data from at least one of the client spreadsheets to the main spreadsheet, from the main spreadsheet to at least one of the client spreadsheets, and back to the main spreadsheet in at least three steps.

12. An apparatus as claimed in claim 1 wherein the server and client computers are configured such that data transferred from one computer to another may be added to or modified by recipients.

13. An apparatus for workflow automation comprising
a server computer,
a plurality of client computers each having an electronic coupling to said server computer for transmission of information between said server computer and each of said client computers and having data entry elements and form interfaces for a user to fill out using said data entry elements,
said server and client computers being configured to have a main spreadsheet on said server computer and client spreadsheets on said client computers with data entered in said form interfaces also appearing in said client spreadsheets, links from at least one of the cells in said main spreadsheet to predetermined cells in said client spreadsheets, and directional instructions for specifying the direction of sequentially routing data from the cells in the client and server spreadsheets,
said server computer being configured to permit creation or revision of said directional instructions and to permit a user to graphically establish linking of cells to determine a flow of information without having to write lines of programming code, resulting in directional instructions to cause the server computer to perform only the calculations and other operations for the workflow which are best performed at a central location and said multiple, client spreadsheets at client computers to display and manipulate only the parts of the workflow data which are relevant to the client user who participates in the workflow process at that client computer.

14. An apparatus as claimed in claim 13 wherein the server and client computers are configured such that data transferred from one computer to another may be added to or modified by recipients.

15. A software product for workflow automation comprising:
an electronic storage medium holding electronic information which, when loaded on a server computer and a plurality of client computers electronically coupled to the server computer causes
the server and client computers to be configured to have a main spreadsheet on the server computer and client spreadsheets on the client computers, links from at least one of the cells in the main spreadsheet to selected cells in the client spreadsheets, and directional instructions for specifying the direction of sequentially routing data from the cells in the client and server spreadsheets.

16. An apparatus as claimed in claim 15 wherein the server and client computers are configured such that data transferred from one computer to another may be added to or modified by recipients.

17. A method of workflow automation comprising the steps of:
providing a server computer and a plurality of client computers each having an electronic coupling to said server computer for transmission of information between said server computer and each of said client computers,
entering data into a first client spreadsheet on a first client computer,
transmitting the entered data from at least one linked cell from the first client spreadsheet to a predetermined cell in a main spreadsheet on the server computer according to directions stored on the first client computer,
processing the data currently stored on the main spreadsheet with the entered data from the client spreadsheet creating updated data in the main spreadsheet, and
transmitting the updated data from the main spreadsheet or a derivative of such data to a predetermined cell in a second spreadsheet on a second client computer for further processing.

18. A method as claimed in claim 17 wherein said data entry step comprises entering data into a form interface and directing data entered in said form interface to said first client spreadsheet.

19. A method as claimed in claim 17 further comprising the preliminary step of graphically creating a workflow plan establishing the spreadsheets and directional instructions for determining data flows between the computers.

20. A method as claimed in claim 17 wherein at least one of said transmission steps comprises transmitting over electronic mail.

21. A method as claimed in claim 17 wherein at least one of said transmission steps comprises transmitting over the Internet.

22. A method as claimed in claim 17 wherein at least one of said transmission steps comprises transmitting data files.

23. A method as claimed in claim 17 further comprising the preliminary step of graphically establishing links of cells to determine a flow of information without writing lines of programming code.

24. A method as claimed in claim 17 further comprising the preliminary step of graphically specifying actions and operations which are performed when data is transferred.

25. A method as claimed in claim 17 wherein the main spreadsheet consolidates workflow data.

26. A method as claimed in claim 17 further comprising after said first transmitting step, performing calculations and operations in the server computer which are best performed at a central location.

27. A method as claimed in claim 17 further comprising after said entering step, displaying and manipulating data in the first client computer, which are relevant to the client user who participates in the workflow process at the first client computer.

28. A method as claimed in claim 17 further comprising after said second transmitting step, displaying and manipulating data in the second client computer, which are relevant to the client user who participates in the workflow process at the second client computer.

29. An apparatus as claimed in claim 17 wherein the server and client computers are configured such that data transferred from one computer to another may be added to or modified by recipients.

30. A method of workflow automation comprising the steps of:

providing a server computer and a plurality of client computers each having an electronic coupling to said server computer for transmission of information between said server computer and each of said client computers, graphically creating a workflow plan establishing spreadsheets and directional instructions for determining data flows between the server computer and the client computers, establishing links of cells to determine a flow of information without writing lines of programming code and specifying actions and operations which are performed when data is transferred, entering data into a form interface on a first client computer and directing data entered in the form interface to a first client spreadsheet on the first client computer, displaying and manipulating data in the first client computer the data being that which is relevant to the client user who participates in the workflow process at the first client computer, transmitting the entered data from the first client spreadsheet to a predetermined cell in a main spreadsheet on the server computer according to directions stored on the first client computer, performing calculations and operations in the server computer, the calculations and operations being those which are best performed at a central location, transmitting the data or a derivative of such data from the main spreadsheet to a predetermined cell in a second spreadsheet on a second client computer for farther processing, and displaying and manipulating data in the second client computer, the data being that which is relevant to the client user who participates in the workflow process at the second client computer.

31. An apparatus as claimed in claim 30 wherein the server and client computers are configured such that data transferred from one computer to another may be added to or modified by recipients.

* * * * *